(12) United States Patent
Okamura et al.

(10) Patent No.: US 11,440,533 B2
(45) Date of Patent: Sep. 13, 2022

(54) CONTROL SYSTEM FOR HYBRID VEHICLE

(71) Applicants: TOYOTA JIDOSHA KABUSHIKI KAISHA, Toyota (JP); DENSO TEN Limited, Kobe (JP)

(72) Inventors: Yukari Okamura, Gotemba (JP); Yasuhiro Oshiumi, Gotemba (JP); Yumeto Shiraki, Kobe (JP)

(73) Assignees: TOYOTA JIDOSHA KABUSHIKI KAISHA, Toyota (JP); DENSO TEN LIMITED, Kobe (JP)

( * ) Notice: Subject to any disclaimer, the term of this patent is extended or adjusted under 35 U.S.C. 154(b) by 275 days.

(21) Appl. No.: 16/896,697

(22) Filed: Jun. 9, 2020

(65) Prior Publication Data
US 2020/0398820 A1    Dec. 24, 2020

(30) Foreign Application Priority Data
Jun. 18, 2019    (JP) .............................. JP2019-112628

(51) Int. Cl.
*B60W 20/40* (2016.01)
*B60W 10/08* (2006.01)
*B60W 10/02* (2006.01)
*B60W 10/115* (2012.01)

(52) U.S. Cl.
CPC ............ *B60W 20/40* (2013.01); *B60W 10/02* (2013.01); *B60W 10/08* (2013.01); *B60W 10/115* (2013.01); *B60W 2510/081* (2013.01); *B60W 2520/10* (2013.01); *B60W 2540/10* (2013.01); *B60W 2540/106* (2013.01); *B60W 2710/021* (2013.01); *B60W 2710/025* (2013.01); *B60W 2710/081* (2013.01); *B60W 2710/1005* (2013.01)

(58) Field of Classification Search
CPC ...... B60W 20/40; B60W 10/02; B60W 10/08; B60W 2520/10; B60W 2540/10; B60W 20/20; B60W 2710/081; B60W 10/115; B60W 2540/106; B60W 2710/021; B60W 2710/025; B60W 2710/1005; B60K 6/365
USPC ................................................... 475/5; 477/5
See application file for complete search history.

(56) References Cited

U.S. PATENT DOCUMENTS

| | | | |
|---|---|---|---|
| 2016/0325730 A1 | 11/2016 | Ono et al. | |
| 2017/0015325 A1* | 1/2017 | Lindstrom | B60W 10/08 |
| 2018/0312050 A1* | 11/2018 | Endo | B60W 10/08 |
| 2021/0370910 A1* | 12/2021 | Ebuchi | B60K 6/445 |

FOREIGN PATENT DOCUMENTS

| | | | | |
|---|---|---|---|---|
| JP | 2013-096555 A | | 5/2013 | |
| JP | 2015-131513 A | | 7/2015 | |
| JP | 2017178299 A | * | 10/2017 | B60K 6/365 |

* cited by examiner

Primary Examiner — Roger L Pang
(74) Attorney, Agent, or Firm — Oliff PLC

(57) ABSTRACT

A control system for a hybrid vehicle that reduces delay in engagement of a clutch when shifting an operating mode by manipulating the clutch. A controller is configured to adjust a speed of a first motor to a first standby speed at which the speed difference in a first clutch is reduced when an operating mode will be shifted from a single-motor mode to a first mode, and adjust a speed of the first motor to a second standby speed at which a speed difference in the second clutch is reduced when the operating mode will be shifted from the single-motor mode to a second mode.

10 Claims, 13 Drawing Sheets

| Operating Mode | | CL1 | CL2 | B1 | MG1 | MG2 | ENG |
|---|---|---|---|---|---|---|---|
| HV Mode | HV-Low Mode | ● | – | – | G | M | ON |
| | HV-High Mode | – | ● | – | G | M | ON |
| | Fixed Mode | ● | ● | – | M | M | ON |
| EV Mode | Dual-Motor Mode EV-Low Mode | ● | – | ● | M | M | OFF |
| | Dual-Motor Mode EV-High Mode | – | ● | ● | M | M | OFF |
| | Single-Motor Mode | – | – | – | | M | OFF |

Fig. 3

CONTROL SYSTEM FOR HYBRID VEHICLE

CROSS-REFERENCE TO RELATED APPLICATIONS

The present disclosure claims the benefit of Japanese Patent Application No. 2019-112628 filed on Jun. 18, 2019 with the Japanese Patent Office, the disclosures of which are incorporated herein by reference in its entirety.

BACKGROUND

Field of the Disclosure

Embodiments of the present disclosure relate to the art of a control system for a hybrid vehicle in which a prime mover includes an engine and a motor, and in which a plurality of operating mode can be selected.

Discussion of the Related Art

JP-A-2015-131513 and JP-A-2013-096555 describe a hybrid vehicle in which a prime mover includes an engine and a motor. In the hybrid vehicle taught by JP-A-2015-131513, output torque of the engine is distributed to a first motor and to an output side through a power split planetary gear mechanism. The torque transmitted to the first motor is translated into electricity and supplied to a second motor to generate torque, and the torque generated by the second motor is added to the torque of the engine delivered to drive wheels. In order to selectively interrupt power transmission between the second motor and the drive wheels, a clutch having a first engagement element and a second engagement element is disposed on a power transmission path from the engine and the second motor to the drive wheels.

According to the teachings of JP-A-2015-131513, a control unit of the hybrid vehicle is configured to reduce an engagement delay of the clutch when shifting an operating mode to a hybrid mode in which the hybrid vehicle is powered by the engine and the second motor. To this end, specifically, the control unit selects an idling mode after the clutch is disengaged when shifting the operating mode to the hybrid mode. In the idling mode, the second engagement element of the clutch connected to the second motor is rotated at a speed lower than a speed of the first engagement element.

That is, the control unit taught by JP-A-2015-131513 is configured to reduce a speed difference between the first engagement element and the second engagement element of the clutch by establishing the idling mode to maintain a speed of the second motor to a standby speed. According to the teachings of JP-A-2015-131513, an engagement delay of the clutch can be reduced to ensure acceleration response when shifting the operating mode to the hybrid mode. Given that the idling mode taught by JP-A-2015-131513 is always established at a same specific speed in a hybrid vehicle in which an operating mode is shifted among a plurality of modes by manipulating a plurality of clutches, an engagement delay of a predetermined clutch may be reduced when shifting to a predetermined mode. However, when shifting to another mode, a speed difference between engagement elements of another clutch may be rather increased and acceleration response of the hybrid vehicle may be reduced.

SUMMARY

Aspects of embodiments of the present disclosure have been conceived noting the foregoing technical problems, and it is therefore an object of the present disclosure to provide a control system for a hybrid vehicle configured to reduce delay in engagement of a clutch when shifting an operating mode by manipulating the clutch.

The control system according to the exemplary embodiment of the present disclosure is applied to a hybrid vehicle comprising: a prime mover including an engine, a first motor, and a second motor; a first differential mechanism that performs a differential action among a first rotary element that is connected to the engine, a second rotary element that is connected to the first motor, and a third rotary element that transmits torque to a pair of drive wheels; a second differential mechanism that performs a differential action among a fourth rotary element that is connected to the second motor, a fifth rotary element that is connected to the third rotary element, and a sixth rotary element; a first engagement device that selectively connects the first rotary element to the sixth rotary element; and a second engagement device that selectively connects any two of the fourth rotary element, the fifth rotary element, and the sixth rotary element. In the hybrid vehicle, the first engagement device and the second engagement device are controlled respectively by the first motor when engaged. An operating mode of the hybrid vehicle is selected from a plurality of modes including: a first mode established by engaging the first engagement device; a second mode established by engaging the second engagement device, in which the torque delivered to the drive wheels is smaller compared to the first mode; and a single-motor mode established by disengaging both of the first engagement device and the second engagement device, in which the hybrid vehicle is propelled only by a drive torque generated by the second motor. Specifically, each of the first engagement device and the second engagement device comprises an input element and an output element engaged to each other to transmit the torque. In order to achieve the above-explained objective, according to the exemplary embodiment of the present disclosure, a speed difference between the input element and the output element of each of the first engagement device and the second engagement device is controlled by the first motor. To this end, a controller is configured to: estimate an operating mode to be shifted from the single-motor mode to the first mode and the second mode; adjust a speed of the first motor to a first standby speed at which the speed difference between the input element and the output element of the first engagement device is reduced, when the controller estimates that the operating mode will be shifted from the single-motor mode to the first mode; and adjust the speed of the first motor to a second standby speed at which the speed difference between the input element and the output element of the second engagement device is reduced, when the controller estimates that the operating mode will be shifted from the single-motor mode to the second mode.

In a non-limiting embodiment, the controller may be further configured to: determine a satisfaction of a condition to adjust the speed of the first motor to the first standby speed or the second standby speed; and adjust the speed of the first motor to the first standby speed or the second standby speed upon satisfaction of the condition.

In a non-limiting embodiment, the controller may be further configured to: detect a speed of the hybrid vehicle; determine that the condition to adjust the speed of the first motor to the first standby speed or the second standby speed is satisfied if a detected speed of the hybrid vehicle is higher than a first predetermined speed; and determine that the condition to adjust the speed of the first motor to the first standby speed or the second standby speed is not satisfied if the detected speed of the hybrid vehicle is equal to or lower than the first predetermined speed.

In a non-limiting embodiment, the controller may be further configured to: detect a speed of the hybrid vehicle; detect a required drive force to propel the hybrid vehicle; and estimate the operating mode to be shifted from the single-motor mode based on at least any one of the speed of the hybrid vehicle and the required drive force.

In a non-limiting embodiment, the controller may be further configured to: detect a speed of the hybrid vehicle; detect a required drive force to propel the hybrid vehicle; and calculate the first standby speed and the second standby speed based on the speed of the hybrid vehicle or the required drive force and the estimated operating mode to be shifted from the single-motor mode.

In a non-limiting embodiment, the controller may be further configured to: estimate the operating mode to be shifted from the single-motor mode based on the required drive force; estimate that the operating mode is to be shifted from the single-motor mode to the first mode when the required drive force is less than a predetermined value; and estimate that the operating mode is to be shifted from the single-motor mode to the second mode when the required drive force is equal to or greater than the predetermined value.

In a non-limiting embodiment, the controller may be further configured to: estimate the operating mode to be shifted from the single-motor mode based on the speed of the hybrid vehicle; estimate that the operating mode is to be shifted from the single-motor mode to the first mode when the speed of the hybrid vehicle is higher than the first predetermined speed but lower than a second predetermined speed; and estimate that the operating mode is to be shifted from the single-motor mode to the second mode when the speed of the hybrid vehicle is equal to or higher than the second predetermined speed.

In a non-limiting embodiment, the first standby speed may be set in a forward direction corresponding to a rotational direction of the engine, and the second standby speed may be set in a reverse direction opposite to the rotational direction of the engine.

In a non-limiting embodiment, the controller may be further configured to: increase the first standby speed in the forward direction with an increase on a speed of the hybrid vehicle; and increase the second standby speed in the reverse direction with an increase on the speed of the hybrid vehicle.

In a non-limiting embodiment, the controller may be further configured to: detect a position of an accelerator pedal; detect a required drive force to propel the hybrid vehicle; and estimate that the operating mode is shifted from the single-motor mode to the first mode when the position of the accelerator pedal is changed at a rate equal to or higher than a predetermined change rate, or when the required drive force is equal to or greater than a predetermined value.

Thus, according to the exemplary embodiment of the present disclosure, a speed difference between the input element and the output element of the first engagement device is reduced in advance when shifting the operating mode from the single-motor mode in which both of the first engagement device and the second engagement device are disengaged to the first mode. Likewise, a speed difference between the input element and the output element of the second engagement device is also reduced in advance when shifting the operating mode from the single-motor mode to the second mode. To this end, the speed of the first motor is adjusted to the first standby speed when the operating mode is expected to be shifted from the single-motor mode to the first mode by engaging the first engagement device, and the speed of the first motor is adjusted to the second standby speed when the operating mode is expected to be shifted from the single-motor mode to the second mode by engaging the second engagement device. That is, the standby speed of the first motor is changed depending on the operating mode to be shifted from the single-motor mode. According to the exemplary embodiment of the present disclosure, therefore, the speed difference between the input element and the output element of the engagement device to be engaged is reduced in advance in any of the cases of shifting the operating mode from the single-motor mode to the first mode and to the second mode. For this reason, the engagement device may be engaged promptly without delay to ensure acceleration response of the hybrid vehicle when shifting the operating mode from the single-motor mode.

In addition, when the hybrid vehicle is propelled at a speed equal to or lower than the first predetermined speed in the single-motor mode, the first motor will not be actuated to reduce the speed difference between the input element and the output element of the engagement device. According to the exemplary embodiment of the present disclosure, therefore, an electric consumption can be reduced.

Further, even if the speed of the hybrid vehicle is higher than the second predetermined speed during propulsion in the single-motor mode, the operating mode will be shifted from the single-motor mode to the first mode to generate a large drive force if the accelerator pedal is depressed deeply at a rate equal to or higher than a predetermined rate. According to the exemplary embodiment of the present disclosure, therefore, the acceleration response of the hybrid vehicle may be ensured and the required drive force may be delivered to the drive wheels promptly even when the large drive force is required during propulsion in the single-motor mode.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 3 is a table showing engagement states of engagement devices and operating conditions of the prime movers in each operating mode;

DETAILED DESCRIPTION OF THE PREFERRED EMBODIMENT(S)

Figure 1:
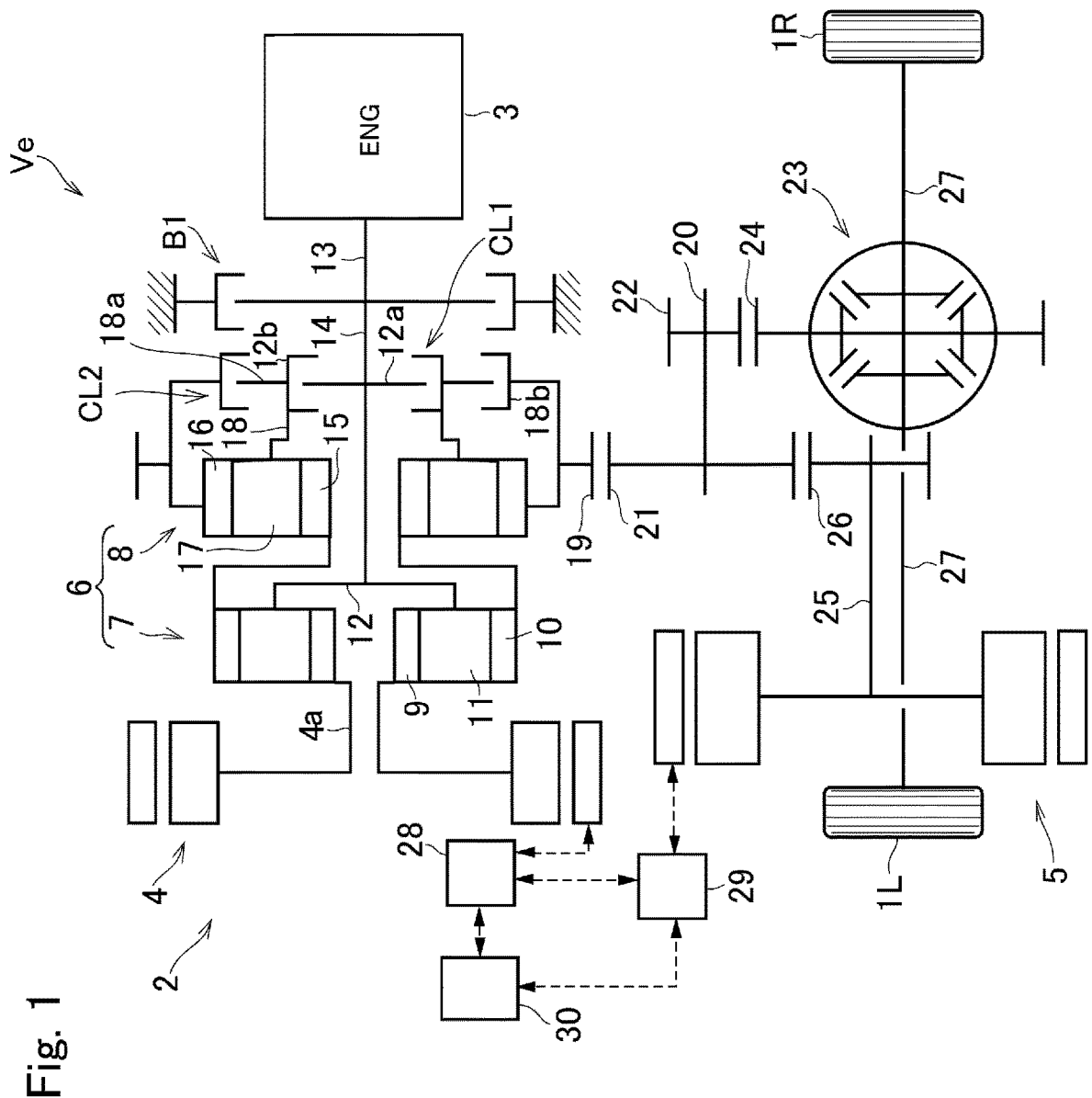
FIG. 1 is a skeleton diagram showing a drive unit of a hybrid vehicle to which the control system according to embodiment of the present disclosure is applied.

An exemplary embodiment of the present application will now be explained with reference to the accompanying drawings. Referring now to FIG. 1, there is shown one example of a structure of a hybrid vehicle (as will be simply called the "vehicle" hereinafter) Ve to which the control system according to the embodiment is applied. Specifically, FIG. 1 shows a drive unit 2 of the vehicle Ve that drives a pair of front wheels 1R and 1L, and the drive unit 2 comprises an engine (referred to as "ENG" in the drawings) 3, a first motor (referred to as "MG1" in the drawings) 4, and a second motor (referred to as "MG2" in the drawings) 5. According to the exemplary embodiment, a motor-generator having a generating function is adopted as the first motor 4. In the vehicle Ve, a speed of the engine 3 is controlled by the first motor 4, and the second motor 5 is driven by electric power generated by the first motor 4 to generate a drive force for propelling the vehicle Ve. Optionally, the motor-generator having a generating function may also be employed as the second motor 5.

A power split mechanism 6 as a differential mechanism is connected to the engine 3. The power split mechanism 6 includes a power split section 7 that distributes an output torque of the engine 3 to the first motor 4 side and to an output side, and a transmission section 8 that alters a torque split ratio.

In the vehicle Ve shown in FIG. 1, a single-pinion planetary gear unit adapted to perform differential action among three rotary elements is adopted as the power split section 7. Accordingly, the power split section 7 serves as a first differential mechanism of the embodiment. Specifically, the power split section 7 comprises: a sun gear 9; a ring gear 10 as an internal gear arranged concentrically around the sun gear 9; a plurality of pinion gears 11 interposed between the sun gear 9 and the ring gear 10 while being meshed with both gears 9 and 10; and a carrier 12 supporting the pinion gears 11 in a rotatable manner. In the power split mechanism 6, accordingly, the carrier 12 serves as a first rotary element, the sun gear 9 serves as a second rotary element, and the ring gear 10 serves as a third rotary element.

An output shaft 13 of the engine 3 is connected to an input shaft 14 of the power split mechanism 6 connected to the carrier 12 so that output power of the engine 3 is applied to the carrier 12. Optionally, an additional gear unit may be interposed between the input shaft 14 and the carrier 12, and a damper device and a torque converter may be interposed between the output shaft 13 and the input shaft 14.

The sun gear 9 is connected to the first motor 4. In the vehicle Ve shown in FIG. 1, the power split section 7 and the first motor 4 are arranged concentrically with a rotational center axis of the engine 3, and the first motor 4 is situated on an opposite side of the engine 3 across the power split section 7. The transmission section 8 is interposed coaxially between the power split section 7 and the engine 3.

The transmission section 8 is also a single-pinion planetary gear unit comprising: a sun gear 15; a ring gear 16 as an internal gear arranged concentrically around the sun gear 15; plurality of pinion gears 17 interposed between the sun gear 15 and the ring gear 16 while being meshed with both gears 17 and 18; and a carrier 18 supporting the pinion gears 17 in a rotatable manner. Thus, the transmission section 8 is also adapted to perform a differential action among the sun gear 15, the ring gear 16, and the carrier 18. Accordingly, the transmission section 8 serves as a second differential mechanism of the embodiment. In the transmission section 8 the sun gear 15 is connected to the ring gear 10 of the power split section 7, and the ring gear 16 is connected to an output gear 19. In the power split mechanism 6, accordingly, the ring gear 16 serves as a fourth rotary element, the sun gear 15 serves as a fifth rotary element, and the carrier 18 serves as a sixth rotary element.

In order to use the power split section 7 and the transmission section 8 as a complex planetary gear unit, a first clutch CL1 as a first engagement device is disposed to selectively connect the carrier 18 of the transmission section 8 to the carrier 12 of the power split section 7 connected to the input shaft 14. The first clutch CL1 includes a pair of an engagement elements 12a and 12b selectively engaged to each other to transmit the torque. Specifically, the input element 12a is fitted onto the input shaft 14, and the output element 12b is connected to the carrier 18 of the transmission section 8. For example, a wet-type multiple plate clutch or a dog clutch may be adopted as the first clutch CL1. Otherwise, a normally stay clutch may also be adopted as the first clutch CL1. An engagement state of the normally stay clutch is switched upon reception of the command signal, and the normally stay clutch stays in the current engagement state even if the signal transmission thereto is interrupted. Thus, in the drive unit 2 shown in FIG. 1, the power split section 7 is connected to the transmission section 8 to serve as a complex planetary gear unit by engaging the first clutch CL1. In the complex planetary gear unit thus formed, the carrier 12 of the power split section 7 is connected to the carrier 18 of the transmission section 8 to serve as an input element, the sun gear 9 of the power split section 7 serves as a reaction element, and the ring gear 16 of the transmission section 8 serves as an output element. That is, the complex planetary gear unit is configured such that the input shaft 14, the output shaft 4a of the first motor 4, and the driven gear 21 are allowed to rotate in a differential manner.

A second clutch CL2 as a second engagement device is disposed to rotate the rotary elements of the transmission section 8 integrally. For example, a friction clutch, a dog clutch and a normally stay clutch may also be adopted as the second clutch CL2 to selectively connect the carrier 18 to the ring gear 16 or the sun gear 15, or to connect the sun gear 15 to the ring gear 16. In the drive unit 2 shown in FIG. 1, specifically, the second clutch CL2 is engaged to connect the carrier 18 to the ring gear 16 to rotate the rotary elements of the transmission section 8 integrally. The second clutch CL2 includes a pair of engagement elements 18a and 18b selectively engaged to each other to transmit the torque. Specifically, the input element 18a is connected to the carrier 18 of the transmission section 8, and the output element 18b is connected to the ring gear 16 of the transmission section 8.

A counter shaft 20 extends parallel to a common rotational axis of the engine 3, the power split section 7, and the transmission section 8. A driven gear 21 is fitted onto one end of the counter shaft 20 to be meshed with the output gear 19, and a drive gear 22 is fitted onto the other end of the counter shaft 20 to be meshed with a ring gear 24 of a differential gear unit 23 as a final reduction unit. The driven gear 21 is also meshed with a drive gear 26 fitted onto a rotor shaft 25 of the second motor 5 so that power or torque of the second motor 5 is synthesized with power or torque of the output gear 19 at the driven gear 21 to be distributed from the differential gear unit 23 to the front wheels 1R and 1L via each driveshaft 27.

In order to selectively stop a rotation of the engine 3 when operating the first motor 4 to propel the vehicle Ve, a brake B1 as a third engagement device is arranged in the drive unit 2. For example, a frictional engagement device or a dog brake may be adopted as the brake B1, and the brake B1 is fixed to a predetermined stationary member in radially outer side of the output shaft 13 or the input shaft 14. The carrier 12 of the power split section 7 and the carrier 18 of the transmission section 8 are allowed to serve as reaction elements, and the sun gear 9 of the power split section 7 is allowed to serve as an input element by applying the brake B1 to halt the output shaft 13 or the input shaft 14. To this end, the brake B1 may be adapted to stop the rotation of the output shaft 13 or the input shaft 14 not only completely but also incompletely to apply a reaction torque to those shafts. Alternatively, a one-way clutch may be used instead of the brake B1 to restrict a reverse rotation of the output shaft 13 or the input shaft 14.

A first power control system 28 is connected to the first motor 4, and a second power control system 29 is connected to the second motor. Each of the first power control system 28 and the second power control system 29 includes an inverter and a converter respectively. The first power control system 28 and the second power control system 29 are connected to each other, and also connected individually to an electric storage device 30 including a lithium ion battery, a capacitor, and a solid-state battery. For example, when the first motor 4 is operated as a generator while establishing a reaction torque, an electric power generated by the first motor 4 may be supplied directly to the second motor 5 without passing through the electric storage device 30.

Characteristics of the lithium ion battery, the capacitor, and the solid-state battery adopted as the electric storage device 30 are different from one another. The electric storage device 30 may be formed by combining those storage devices arbitrarily according to need.

Figure 2:
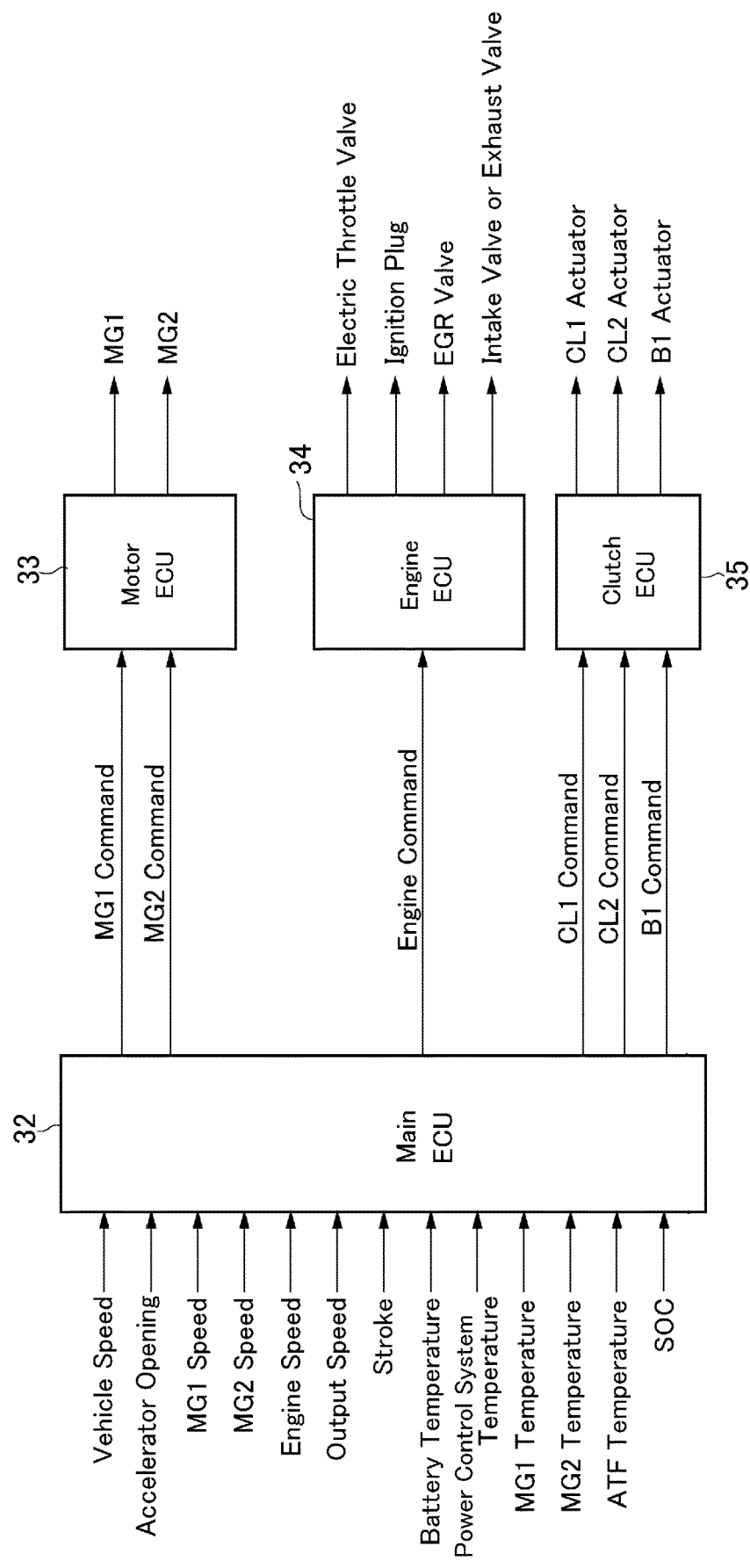
FIG. 2 is a block diagram showing a structure of an electronic control unit.

In order to control the first power control system 28, the second power control system 29, the first clutch CL1, the second clutch CL2, the brake B1 and so on, the vehicle Ve is provided with an electronic control unit (to be abbreviated as the "ECU" hereinafter) 31 as a controller. The ECU 31 has a microcomputer as its main constituent, and as shown in FIG. 2, the ECU 31 comprises a main ECU 32, a motor ECU 33, an engine ECU 34 and a clutch ECU 35.

The main ECU 32 is configured to execute a calculation based on incident data transmitted from sensors as well as maps and formulas installed in advance, and transmits a calculation result to the motor ECU 33, the engine ECU 34 and the clutch ECU 35 in the form of command signal. For example, the main ECU 32 receives data about; a vehicle speed; an accelerator position; a speed of the first motor 4; a speed of the second motor 5; a speed of the output shaft 13 of the engine 3; an output speed such as a rotational speed of the counter shaft 20 of the transmission section 8; strokes of pistons of the clutches CL1, CL2, the brake B1; a temperature of the electric storage device 30; temperatures of the power control systems 28, 29; a temperature of the first motor 4; a temperature of the second motor 5; a temperature of oil (i.e., ATF) lubricating the power split section 7 and the transmission section 8; a state of charge (to be abbreviated as the "SOC" hereinafter) level of the electric storage device 30 and so on.

Specifically, command signals of output torques and speeds of the first motor 4 and the second motor 5 are transmitted from the main ECU 32 to the motor ECU 33. Likewise, command signals of an output torque and a speed of the engine 3 are transmitted from the main ECU 32 to the engine ECU 34, and command signals of torque transmitting capacities (including "0") of the clutches CL1, CL2, and the brakes B1 are transmitted from the main ECU 32 to the clutch ECU 35.

The motor ECU 33 calculates current values applied to the first motor 4 and the second motor 5 based on the data transmitted from the main ECU 32, and transmits calculation results to the motors 4, 5 in the form of command signals. In the vehicle Ve, an AC motor is employed as the first motor 4 and the second motor 5 respectively. In order to control the AC motor, the command signal transmitted from the motor ECU 33 includes command signals for controlling a frequency of a current generated by the inverter and a voltage value boosted by the converter.

The engine ECU 34 calculates current values and pulse numbers to control opening degrees of an electronic throttle valve, an EGR (Exhaust Gas Restriction) valve, an intake valve, an exhaust valve, and an exhaust valve, and to activate an ignition plug, based on the data transmitted from the main ECU 32. Calculation results are transmitted from the engine ECU 34 to the valves and the plug in the form of command signals. Thus, the engine ECU 34 transmits command signals for controlling a power, an output torque and a speed of the engine 3.

The clutch ECU 35 calculates current values supplied to actuators controlling engagement pressures of the clutches CL1, CL2, and the brake B1 based on the data transmitted from the main ECU 32, and transmits calculation results to the actuators in the form of command signals.

In the vehicle Ve, an operating mode may be selected from a hybrid mode (to be abbreviated as the "HV mode" hereinafter) in which the vehicle Ve is propelled by a drive torque generated by the engine 3, and an electric vehicle mode (to be abbreviated as the "EV mode" hereinafter) in which the vehicle Ve is propelled by drive torques generated by the first motor 4 and the second motor 5 without using the engine 3. The HV mode may be selected from a Hybrid-Low mode (to be abbreviated as the "HV-Low mode" hereinafter), a Hybrid-High mode (to be abbreviated as the "HV-High mode" hereinafter), and a fixed mode. Specifically, in the HV-Low mode, a rotational speed of the engine 3 (i.e., a rotational speed of the input shaft 14) is increased higher than a rotational speed of the ring gear 16 of the transmission section 8 when a rotational speed of the first motor 4 is reduced to substantially zero. In turn, in the HV-High mode, a rotational speed of the engine 3 is reduced lower than a rotational speed of the ring gear 16 of the transmission section 8 when a rotational speed of the first motor 4 is reduced to substantially zero. Further, in the fixed mode, the engine 3 and the ring gear 16 of the transmission section 8 are always rotated at substantially same speeds. Here, it is to be noted that a toque amplification factor in the HV-Low mode is greater than that in the HV-High mode.

The EV mode may be selected from a dual-motor mode in which both of the first motor 4 and the second motor 5 generate drive torques to propel the vehicle Ve, and a single-motor mode in which only the second motor 5 generates a drive torque to propel the vehicle Ve. Further, the dual-motor mode may be selected from an Electric Vehicle-Low mode (to be abbreviated as the "EV-Low mode" hereinafter) in which a torque of the first motor 4 is multiplied by a relatively larger factor, and an Electric Vehicle-High mode (to be abbreviated as the "EV-High mode" hereinafter) in which a torque of the first motor 4 is multiplied by a relatively smaller factor. In the single-motor mode, the vehicle Ve is powered only by the second motor 5 while disengaging both of the first clutch CL1 and the second clutch CL2.

FIG. 3 shows engagement states of the first clutch CL1, the second clutch CL2, and the brake B1, and operating conditions of the first motor 4, the second motor 5, and the engine 3 in each operating mode. In FIG. 3, "●" represents that the engagement device is in engagement, "-" represents that the engagement device is in disengagement, "G" represents that the motor serves mainly as a generator, "M" represents that the motor serves mainly as a motor, blank represents that the motor serves as neither a motor nor a generator or that the motor is not involved in propulsion of the vehicle Ve, "ON" represents that the engine 3 generates a drive torque, and "OFF" represents that the engine 3 does not generate a drive torque.

Rotational speeds of the rotary elements of the power split mechanism 6, and directions of torques of the engine 3, the first motor 4, and the second motor 5 in each operating mode are indicated in FIGS. 4 to 9. In the nomographic diagrams shown in FIGS. 4 to 9, distances among the vertical lines represents a gear ratio of the power split mechanism 6, a vertical distance on the vertical line from the horizontal base line represents a rotational speed of the rotary member, an orientation of the arrow represents a direction of the torque, and a length of the arrow represents a magnitude of the torque.

Figure 4:
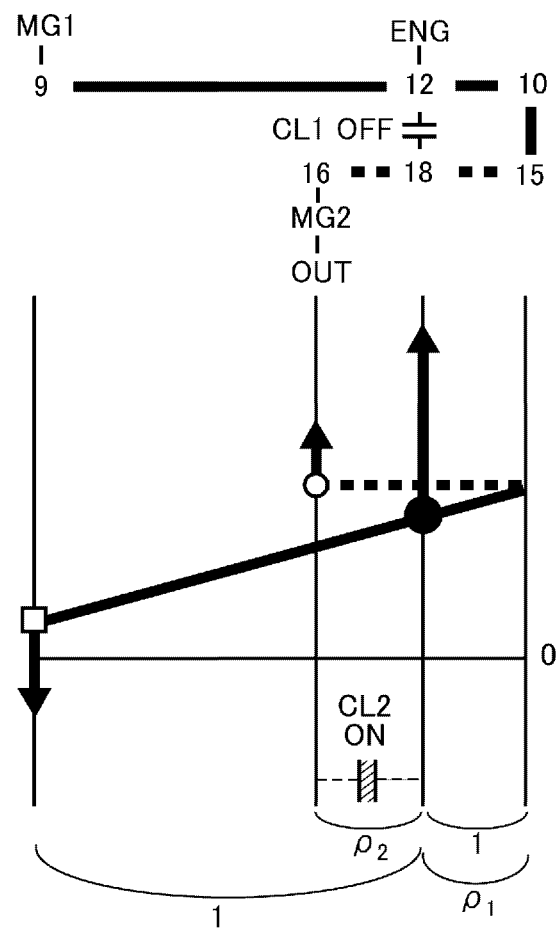
FIG. 4 is a nomographic diagram showing a situation in a HV-High mode.
Figure 5:
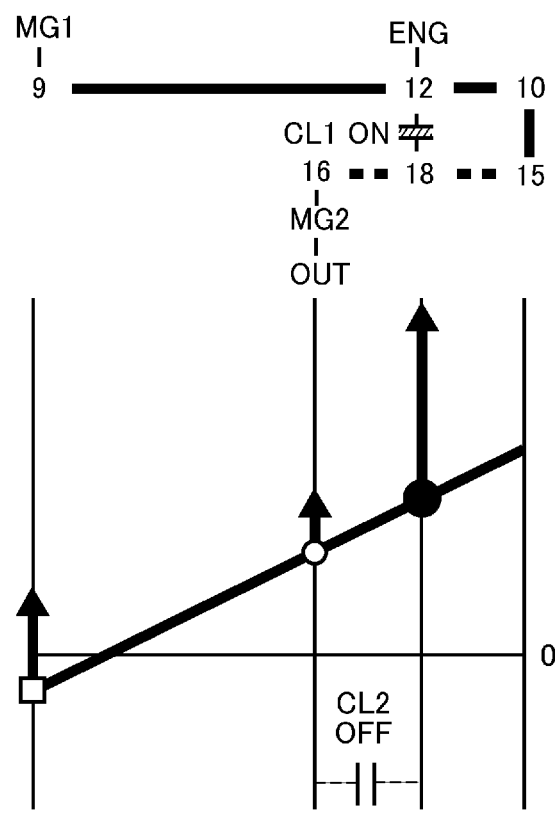
FIG. 5 is a nomographic diagram showing a situation in a HV-Low mode.

As indicated in FIG. 4, in the HV-High mode, the second clutch CL2 is engaged, and the engine 3 generates a drive torque while establishing a reaction torque by the first motor 4. As indicated in FIG. 5, in the HV-Low mode, the first clutch CL1 is engaged, and the engine 3 generates a drive torque while establishing a reaction torque by the first motor 4. In the HV-High mode and the HV-Low mode, a rotational speed of the first motor 4 is controlled in such a manner as to optimize a total energy efficiency in the drive unit 2 including a fuel efficiency of the engine 3 and a driving efficiency of the first motor 4. Specifically, the total energy efficiency in the drive unit 2 may be calculated by dividing a total energy consumption by a power to rotate the front wheels 1R and 1L. A rotational speed of the first motor 4 may be varied continuously, and the rotational speed of the engine 3 is governed by the rotational speed of the first motor 4 and a speed of the vehicle Ve. That is, the power split mechanism 6 may serve as a continuously variable transmission.

As a result of establishing a reaction torque by the first motor 4, the first motor 4 may serve as a generator. In this situation, therefore, a power of the engine 3 is partially translated into an electric energy, and the remaining power of the engine 3 is delivered to the ring gear 16 of the transmission section 8. Specifically, the reaction torque established by the first motor 4 is governed by a split ratio of the torque delivered from the engine 3 to the first motor 4 side through the power split mechanism 6. Such split ratio between the torque delivered from the engine 3 to the first motor 4 side through the power split mechanism 6 and the torque delivered from the engine 3 to the ring gear 16 differs between the HV-Low mode and the HV-High mode.

Given that the torque delivered to the first motor 4 side is "1", a ratio of the torque applied to the ring gear 16 in the HV-Low mode may be expressed as "$1/(\rho 1 \cdot \rho 2)$", and a ratio of the torque applied to the ring gear 16 in the HV-High mode may be expressed as "$1/(\rho 1)$". In other words, given that the torque of the engine 3 is "1", a ratio of the torque of the engine 3 delivered to the ring gear 16 in the HV-Low mode may be expressed as "$1/(1-(\rho 1 \cdot \rho 2))$", and a ratio of the torque of the engine 3 delivered to the ring gear 16 in the HV-High mode may be expressed as "$1/(\rho 1+1)$". In the above expressions, "$\rho 1$" is a gear ratio of the power split section 7 (i.e., a ratio between teeth number of the ring gear 10 and teeth number of the sun gear 9), and "$\rho 2$" is a gear ratio of the transmission section 8 (i.e., a ratio between teeth number of the ring gear 16 and teeth number of the sun gear 15). Specifically, "$\rho 1$" and "$\rho 2$" are smaller than "1", respectively. That is, in the HV-Low mode, a ratio of the torque delivered to the ring gear 16 is increased in comparison with that in the HV-High mode.

Here, when the speed of the engine 3 is increased by the torque generated by the engine 3, the output torque of the engine 3 is reduced by a torque required to increase the speed of the engine 3. In the HV mode, the electric power generated by the first motor 4 is supplied to the second motor 5, and in addition, the electric power accumulated in the electric storage device 30 is also supplied to the second motor 5 as necessary.

Figure 6:
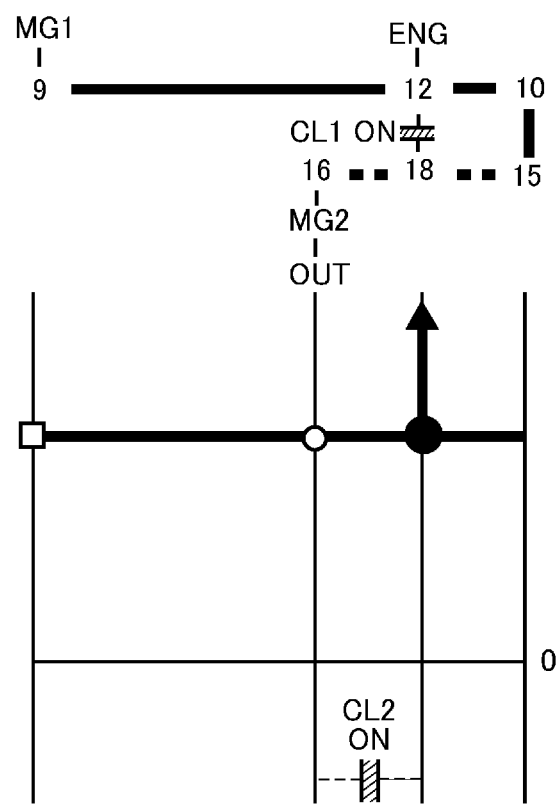
FIG. 6 is a nomographic diagram showing a situation in a fixed mode.

In the fixed mode, as indicated in FIG. 6, both of the first clutch CL1 and the second clutch CL2 are engaged so that all of the rotary elements in the power split mechanism 6 are rotated at same speeds. In other words, the output power of the engine 3 will not be translated into an electric energy by the first motor 4 and the second motor 5. For this reason, a power loss associated with such energy conversion will not be caused in the fixed mode and hence power transmission efficiency can be improved.

Figure 7:
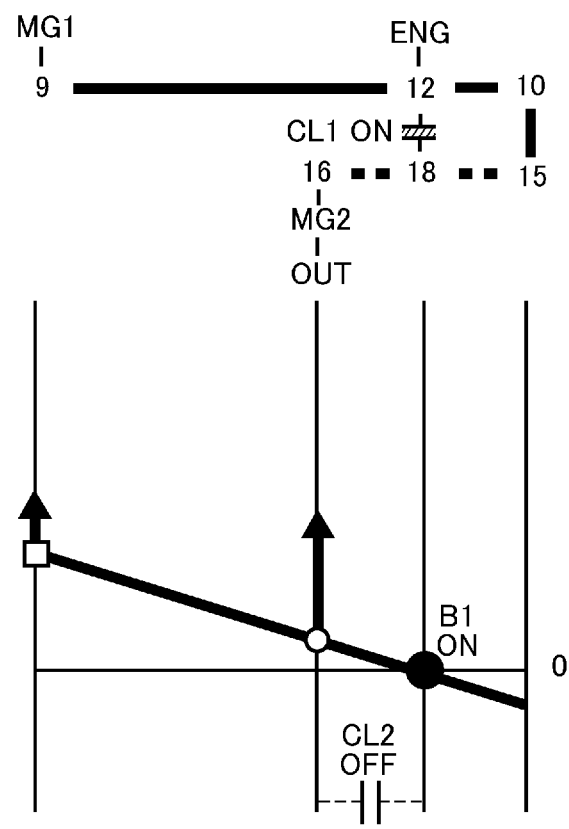
FIG. 7 is a nomographic diagram showing a situation in an EV-Low mode.
Figure 8:
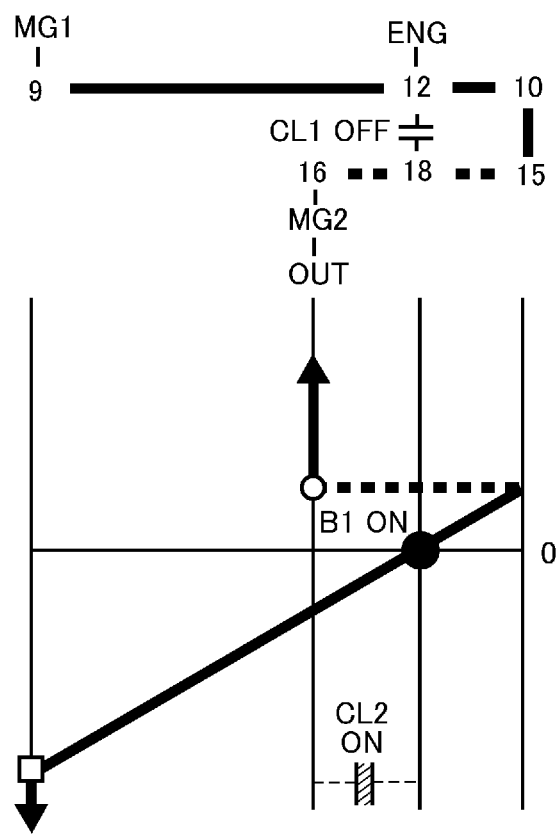
FIG. 8 is a nomographic diagram showing a situation in an EV-High mode.

As indicated in FIGS. 7 and 8, in the EV-Low mode and the EV-High mode, the brake B1 is engaged, and the first motor 4 and the second motor 5 generates the drive torques to propel the vehicle Ve. As indicated in FIG. 7, in the EV-Low mode, the vehicle Ve is propelled by the drive torques generated by the first motor 4 and the second motor 5 while engaging the brake B1 and the first clutch CL1. In this case, the brake B1 establishes a reaction torque to restrict a rotation of the output shaft 13 or the carrier 12. In the EV-Low mode, the first motor 4 is rotated in the forward direction while generating torque in a direction to increase a rotational speed. As indicated in FIG. 8, in the EV-High mode, the vehicle Ve is propelled by drive torques generated by the first motor 4 and the second motor 5 while engaging the brake B1 and the second clutch CL2. In this case, the brake B1 also establishes a reaction torque to restrict a rotation of the output shaft 13 or the carrier 12. In the EV-High mode, the first motor 4 is rotated in the opposite direction (i.e., in a reverse direction) to the rotational direction of the engine 3 in the HV mode, while generating torque in a direction to increase a rotational speed.

Figure 9:
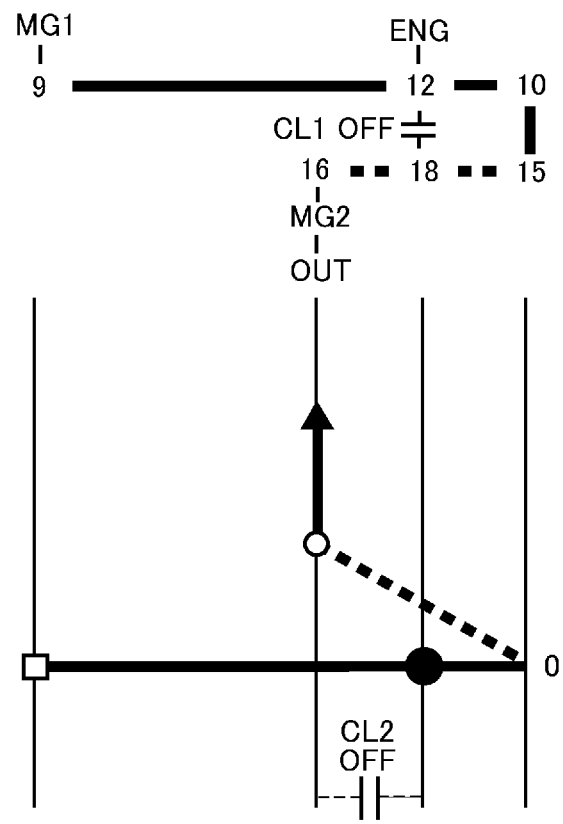
FIG. 9 is a nomographic diagram showing a situation in a single-motor mode.

In the EV-Low mode, a ratio of a rotational speed of the ring gear 16 of the transmission section 8 to a rotational speed of the first motor 4 is reduced smaller than that in the EV-High mode. That is, in the EV-Low mode, the rotational speed of the first motor 4 at a predetermined speed is increased higher than that in the EV-High mode. In other words, a speed reducing ratio in the EV-Low mode is greater than that in the EV-High mode. In the EV-Low mode, therefore, a larger drive force may be generated. Here, in the drive unit 2 shown in FIG. 1, the rotational speed of the ring gear 16 corresponds to a rotational speed of an output member, and the following explanation will be made on the assumption that a gear ratio among each member from the ring gear 16 to the front wheels 1R and 1L is "1" for the sake of convenience. As indicated in FIG. 9, in the single-motor mode, only the second motor 5 generates a drive torque, and both of the first clutch CL1 and the second clutch CL2 are disengaged. In the single-motor mode, therefore, all of the rotary elements of the power split mechanism 6 are stopped. For this reason, the engine 3 and the first motor 4 will not be rotated passively, and hence the power loss can be reduced. Accordingly, the Low mode established by engaging the first clutch CL1 corresponds to a "first mode" of the embodiment of the present disclosure, and the High mode established by engaging the second clutch CL2 corresponds to a "second mode" of the embodiment of the present disclosure.

In the vehicle Ve, the operating mode is selected on the basis of an SOC level of the electric storage device 30, a vehicle speed, a required drive force and so on. According to the embodiment, a selection pattern of the operating mode may be selected from a Charge Sustaining mode (to be abbreviated as the "CS mode" hereinafter) in which the operating mode is selected in such a manner as to maintain the SOC level of the electric storage device 30 as far as possible, and a Charge Depleting mode (to be abbreviated as the "CD mode" hereinafter) in which the operating mode is selected in such a manner as to propel the vehicle Ve while consuming the electric power accumulated in the electric storage device 30. Specifically, the CS mode is selected when the SOC level of the electric storage device 30 is relatively low, and the CD mode is selected when the SOC level of the electric storage device 30 is relatively high.

Figure 10:
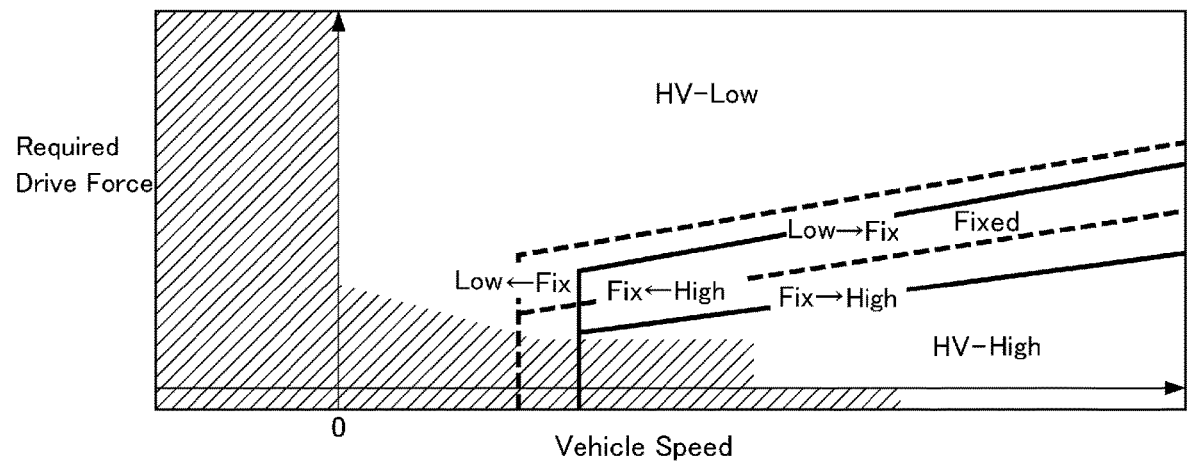
FIG. 10 shows a map for determining an operating mode during propulsion in a CS mode.

FIG. 10 shows an example of a map used to select the operating mode during propulsion in the CS mode. In FIG. 10, the vertical axis represents a required drive force, and the horizontal axis represents a vehicle speed. In order to select the operating mode of the vehicle Ve, the vehicle speed may be detected by a vehicle speed sensor, and the required drive force may be estimated based on an accelerator position detected by an accelerator sensor.

In FIG. 10, the hatched region is an area where the single-motor mode is selected. In the CS mode, the single-motor mode is selected when the vehicle Ve is propelled in a reverse direction irrespective of the required drive force, and when the vehicle Ve is propelled in a forward direction and the required drive force is small (or when decelerating).

During forward propulsion in the CS mode, the HV mode is selected when a large drive force is required. In the HV mode, the drive force may be generated from a low speed range to a high speed range. When the SOC level of the electric storage device 30 falls close to a lower limit level, therefore, the HV mode may be selected even if an operating point governed by the required drive force and the vehicle speed falls within the hatched region.

As described, the HV mode may be selected from the HV-Low mode, the HV-High mode, and the fixed mode. In the CS mode, specifically, the HV-Low mode is selected when the vehicle speed is relatively low and the required drive force is relatively large, the HV-High mode is selected when the vehicle speed is relatively high and the required drive force is relatively small, and the fixed mode is selected when the operating point falls between a region where the HV-Low mode is selected and a region where the HV-High mode is selected.

In the CS mode, the operating mode is shifted from the fixed mode to the HV-Low mode when the operating point is shifted across the "Low←Fix" line from right to left, or when the operating point is shifted across the "Low←Fix" line upwardly from the bottom. By contrast, the operating mode is shifted from the HV-Low mode to the fixed mode when the operating point is shifted across the "Low→Fix" line from left to right, or when the operating point is shifted across the "Low→Fix" line downwardly from the top. Likewise, the operating mode is shifted from the HV-High mode to the fixed mode when the operating point is shifted across the "Fix←High" line from right to left, or when the operating point is shifted across the "Fix←High" line upwardly from the bottom. By contrast, the operating mode is shifted from the fixed mode to the HV-High mode when the operating point is shifted across the "Fix→High" line from left to right, or when the operating point is shifted across the "Fix→High" line downwardly from the top.

Figure 11:
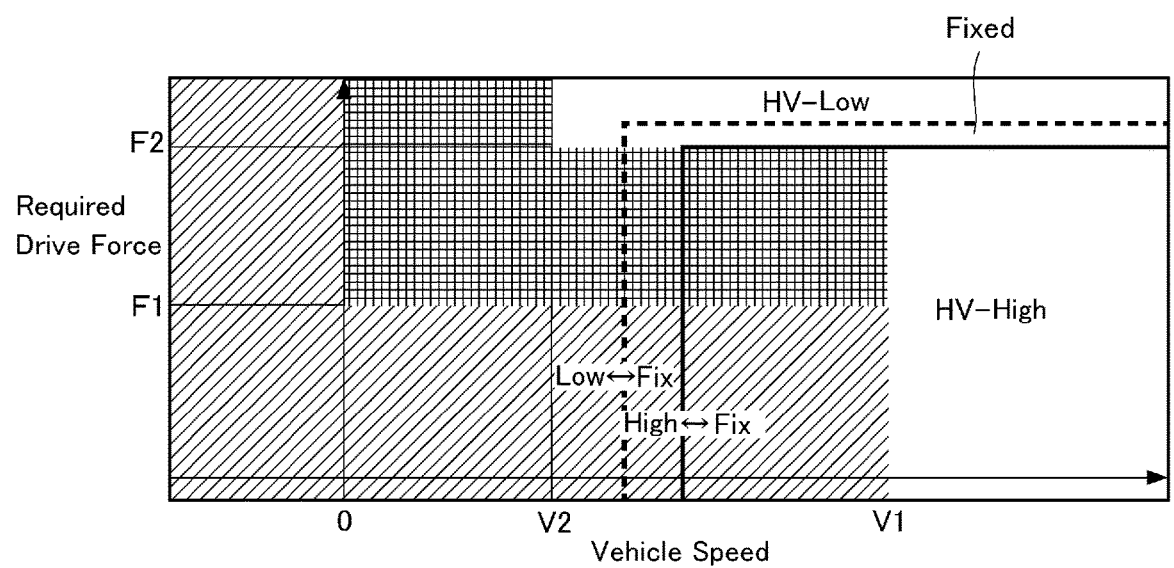
FIG. 11 shows a map for determining an operating mode during propulsion in a CD mode.

FIG. 11 shows an example of a map used to select the operating mode during propulsion in the CD mode. In FIG. 11, the vertical axis also represents the required drive force, and the horizontal axis also represents the vehicle speed.

In FIG. 11, the hatched region is also an area where the single-motor mode is selected. In the CD mode, the single-motor mode is also selected when the vehicle Ve is propelled in the reverse direction irrespective of the required drive force, and when the vehicle Ve is propelled in the forward direction and the required drive force is smaller than a first threshold force value F1 (or when decelerating). Such region where the single-motor mode is selected is determined based on specifications of the second motor 5 and so on.

During forward propulsion in the CD mode, the dual-motor mode is selected when the drive force larger than a first threshold force value F1 is required. In this case, the HV mode is selected when the vehicle speed is higher than a first threshold speed V1, or when the vehicle speed is higher than a second threshold speed V2 and the required drive force is greater than a second threshold force value F2. As described, in the HV mode, the drive force may be generated from the low speed range to the high speed range. When the SOC level of the electric storage device 30 falls close to the lower limit level, therefore, the HV mode may be selected even if the operating point falls within the regions where the single-motor mode and the dual-motor mode are selected.

In the CD mode, the HV-Low mode is also selected when the vehicle speed is relatively low and the required drive force is relatively large, the HV-High mode is also selected when the vehicle speed is relatively high and the required drive force is relatively small, and the fixed mode is also selected when the operating point falls between the region where the HV-Low mode is selected and the region where the HV-High mode is selected.

In the CD mode, specifically, the operating mode is shifted between the fixed mode and the HV-Low mode when the operating point is shifted across the "Low⇆Fix" line. Likewise, the operating mode is shifted between the HV-High mode and the fixed mode when the operating point is shifted across the "Fix⇆High".

In the maps shown in FIGS. 10 and 11, the regions of each of the operating mode and the lines defining the regions may be altered depending on temperatures of the members of the drive unit 2, the electric storage device 30, the power control systems 28 and 29, and an SOC level of the electric storage device 30.

As described, the operating mode of the vehicle Ve is shifted among the above-mentioned modes by manipulating the first clutch CL1, the second clutch CL2, and the brake B1. For example, in a case of shifting the operating mode from the single-motor mode to the HV mode, the operating mode may be shifted to the HV-Low mode and the HV-High mode. Specifically, the operating mode is shifted from the single-motor mode to the HV-Low mode by engaging the first clutch CL1, and to the HV-High mode by engaging the second clutch CL2. Here, a target speed of the first motor 4 to engage the first clutch CL1 is different from a target speed of the first motor 4 to engage the second clutch CL2. That is, a synchronous speed of the first clutch CL1 and a synchronous speed of the second clutch CL2 are different from each other. When shifting the operating mode by manipulating the first clutch CL1 and the second clutch CL2, it is preferable to reduce a time lag due to delay in engagement of the first clutch CL1 and the second clutch CL2. In order to reduce delay in engagement of the first clutch CL1 and the second clutch CL2 when shifting the operating mode from the single-motor mode to another mode, the ECU 31 executes a routine shown in FIG. 12.

Figure 12:
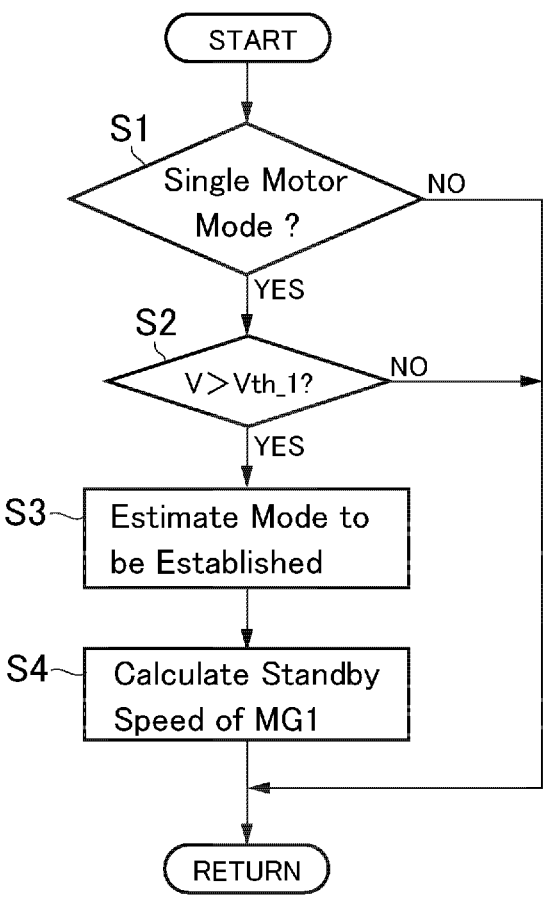
FIG. 12 is a flowchart showing one example of a routine executed by the control system according to the embodiment of the present disclosure.

In other words, the ECU 31 executes the routine shown in FIG. 12 to prevent a reduction in engagement response of the first clutch CL1 or the second clutch CL2 to be engaged when shifting the operating mode from the single-moor mode to the High mode or the Low mode. At step S1, it is determined whether the vehicle Ve is currently propelled in the single-motor mode by generating a drive torque only by the second motor 5. As described, the single-motor mode is selected when a required drive force F is relatively small and a vehicle speed V is relatively low. If the vehicle Ve is not propelled in the single-motor mode so that the answer of step S1 is NO, the routine returns.

By contrast, if the vehicle Ve is propelled in the single-motor mode so that the answer of step S1 is YES, the routine progresses to step S2 to determine whether the current vehicle speed V exceeds a first predetermined speed Vth_1 at which the first motor 4 is brought into a standby mode. That is, it is determined at step S2 whether a condition to adjust the rotational speed of the first motor 4 to a standby speed is satisfied. As explained with reference to FIGS. 10 and 11, the operating mode is shifted from the single-motor mode to the dual-motor mode or the HV mode by engaging the first clutch CL1 or the second clutch CL2 when the vehicle speed V and the required drive force F (or a depression Acc of the accelerator pedal) are increased. According to the exemplary embodiment of the present disclosure, when shifting the operating mode from the single-motor mode by engaging at least one of the first clutch CL1 and the second clutch CL2, a speed of the first motor 4 is controlled in such a manner as to reduce a speed difference between the engagement elements of the clutch so as to enhance engagement response of the clutch. To this end, specifically, the first motor 4 is brought into the standby mode in which a speed of the first motor 4 is adjusted to the standby speed when the current vehicle speed V exceeds the first predetermined speed Vth_1. That is, at step S2, it is determined whether a condition to bring the first motor 4 into the standby mode.

As described, the single-motor mode is selected when the vehicle Ve is propelled at a relatively low speed. In the single-motor mode, the output element 12b of the first clutch CL1 and the output element 18b of the second clutch CL2 individually connected to the output gear 19 are rotated integrally with the output gear 19 at a relatively low speed corresponding to the vehicle Ve. In this situation, the engine 3 and the first motor 4 are stopped so that the input element 12a of the first clutch CL1 is substantially stopped, and the input element 18a of the second clutch CL2 is rotated passively at a speed lower than a speed of the ring gear 16. Thus, when the vehicle Ve is propelled at a low speed in the single-motor mode, both of the input element 12a and the output element 12b of the first clutch CL1 are rotated at low speeds, and both of the input element 18a and the output element 18b of the second clutch CL2 are rotated at low speeds. That is, a speed difference between the input element 12a and the output element 12b of the first clutch CL1 is small, and a speed difference between the input element 18a and the output element 18b of the second clutch CL2 is also small. In the single-motor mode, therefore, it is not necessary to execute the control to reduce delay in engagement of the first clutch CL1 and the second clutch CL2. Specifically, if the current vehicle speed V is equal to or lower than the first predetermined speed Vth_1, the operating mode of the vehicle Ve is maintained to the single-motor mode, and the answer of step S2 will be NO. In this case, the routine returns without executing any specific control.

By contrast, if the current vehicle speed V is higher than the first predetermined speed Vth_1 so that the answer of step S2 is YES, the routine progresses to step S3 to estimate the operating mode to be established based on the current vehicle speed V and the required drive force F or the accelerator position Acc. In this case, the operating mode will be shifted from the single-motor mode to the HV-Low mode, the HV-High mode, the EV-Low mode, or the EV-High mode with reference to the maps shown in FIGS. 10 and 11. For example, in the case that the vehicle speed V is relatively low or the required drive force F is relatively large, the ECU 31 estimates that the operating mode will be shifted from the single-motor mode to the Low mode by engaging the first clutch CL1. By contrast, in the case that the vehicle speed V is relatively high or the required drive force F is relatively small, the ECU 31 estimates that the operating mode will be shifted from the single-motor mode to the High mode by engaging the second clutch CL2.

Then, at step S4, the standby speed of the first motor 4 is calculated. In the drive unit 2, when the sun gear 9 is rotated by the first motor 4 during forward propulsion, the ring gear 10 and the sun gear 15 connected thereto are rotated at a rotational speed of the first motor 4, and consequently, the carrier 18 is rotated at a speed governed by rotational speeds of the sun gear 15 and the ring gear 16 connected to the output gear 19. As described, the output element 12b of the first clutch CL1 and the input element 18a of the second clutch CL2 are connected to the carrier 18 respectively. That is, the output element 12b of the first clutch CL1 and the input element 18a of the second clutch CL2 are rotated at the rotational speed of the first motor 4. In this situation, therefore, a speed difference between the input element 12a and the output element 12b of the first clutch CL1, and a speed difference between the input element 18a and the output element 18b of the second clutch CL2 can be controlled by controlling the speed of the first motor 4. To this end, at step S4, the standby speed of the first motor 4 is calculated in such a manner as to reduce the speed difference between the input element 12a and the output element 12b of the first clutch CL1 or between the input element 18a and the output element 18b of the second clutch CL2, in accordance with the operating mode estimated at step S3.

In this situation, a required speed of the first motor 4 to synchronize a speed of the output element 12b with a speed of the input element 12a in the first clutch CL1 is different from a required speed of the first motor 4 to synchronize a speed of the input element 18a with a speed of the output element 18b of the second clutch CL2. For example, in a case of shifting the operating mode from the single-motor mode to the EV-Low mode, the first motor 4 has to be rotated in the forward direction while engaging the first clutch CL1 as indicated in FIG. 7. By contrast, in a case of shifting the operating mode from the single-motor mode to the EV-High mode, the first motor 4 has to be rotated in the backward direction while engaging the second clutch CL2 as indicated in FIG. 8. That is, if the standby speed of the first motor 4 is set to a constant speed, any one of the first clutch CL1 or the second clutch CL2 may be engaged promptly under a specific condition, but the speed difference between the input element and the output element of the first clutch CL1 or the second clutch CL2 may be rather increased under different conditions. At step S4, therefore, the standby speed of the first motor 4 is calculated based on the operating mode estimated at step S3 and the current vehicle speed V.

Figure 13:
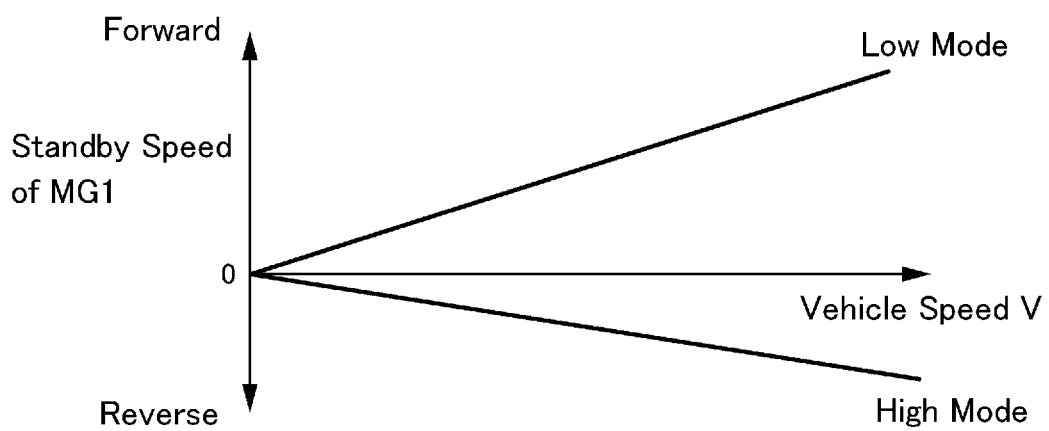
FIG. 13 shows a map determining a standby speed of the first motor in the Low-mode and the High-mode with respect to a vehicle speed.

One example of a map for determining the standby speed of the first motor 4 is shown in FIG. 13. As indicated in FIG. 13, in the case of shifting the operating mode from the single-motor mode to the Low mode, the standby speed of the first motor 4 is increased in the forward direction corresponding to a rotational direction of the engine 3 with an increase in the vehicle speed V. By contrast, in the case of shifting the operating mode from the single-motor mode to the High mode, the standby speed of the first motor 4 is increased in the reverse direction with an increase in the vehicle speed V. That is, an absolute value of the standby speed of the first motor 4 is increased with an increase in the vehicle speed V. In the following explanation, the standby speed of the first motor 4 set to shift the operating mode from the single-motor mode to the Low mode will be called the "first standby speed", and the standby speed of the first motor 4 set to shift the operating mode from the single-motor mode to the High mode will be called the "second standby speed". The standby speed of the first motor 4 and a change rate of the standby speed may be adjusted in accordance with a type of the vehicle Ve. For example, given that the vehicle Ve is a sports car, the change rate of the standby speed with respect to the vehicle speed Ve may be increased to enhance agility of the vehicle Ve. By contrast, the change rate of the standby speed with respect to the vehicle speed Ve may also be reduced to improve fuel efficiency.

Figure 14:
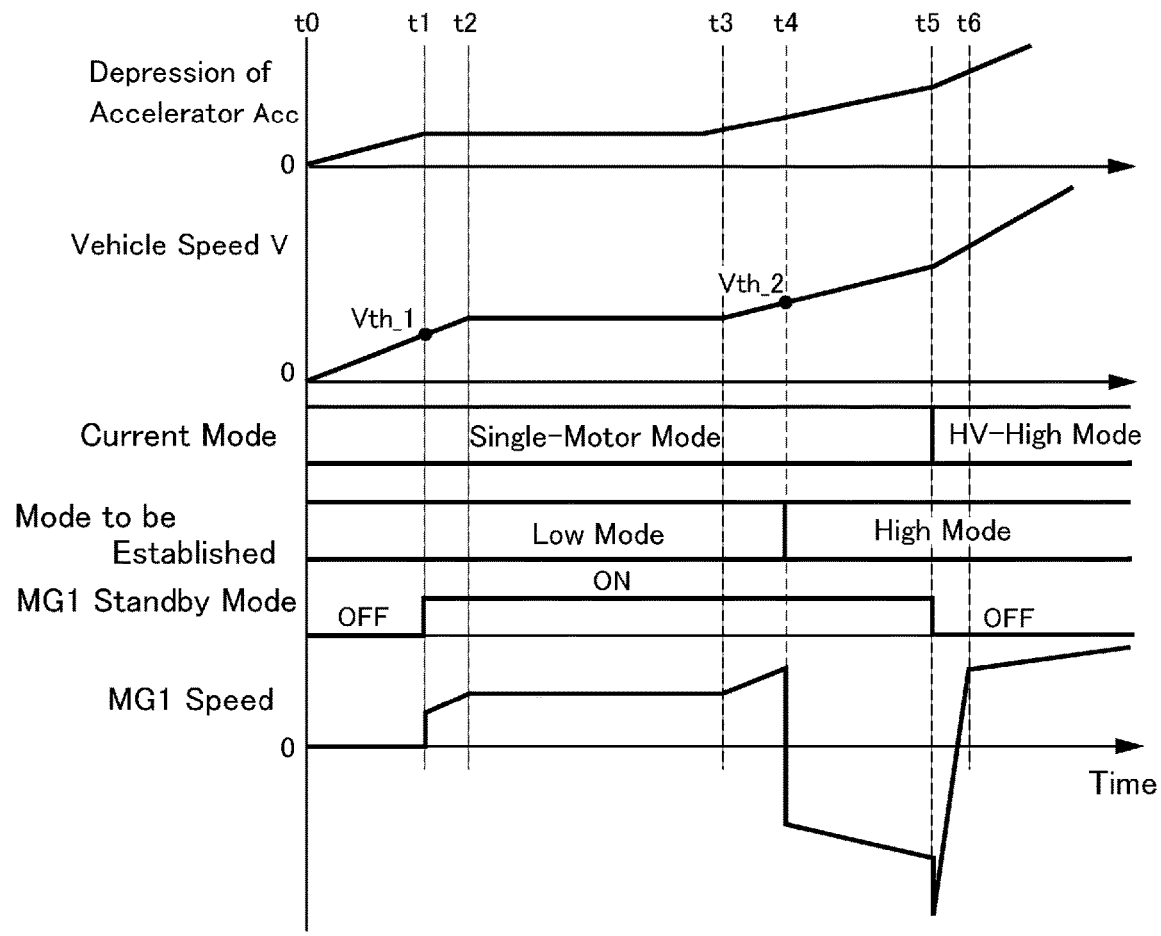
FIG. 14 is a time chart indicating a temporal change in the situation of the hybrid vehicle during execution of the routine shown in FIG. 12.

Turning to FIG. 14, there is shown a temporal change in the speed of the first motor 4 in a case of shifting the operating mode from the single-motor mode to the HV-High mode while executing the routine shown in FIG. 12.

At point t0, the accelerator pedal is depressed by the driver to launch the vehicle Ve so that a depression Acc of the accelerator pedal is increased gradually. In this situation, the accelerator pedal is not depressed deeply and a vehicle speed V is still low, therefore, the vehicle Ve is propelled in the single-motor mode. That is, the vehicle speed V is still lower than the above-mentioned first predetermined speed Vth_1, and hence the first motor 4 has not yet been brought into the standby mode. Specifically, the rotational speed of the first motor 4 is still maintained to zero.

As a result of depressing the accelerator pedal, the vehicle speed V reaches the first predetermined speed Vth_1 at point t1 so that a flag to bring the first motor 4 into the standby mode is turned on. Consequently, the speed of the first motor 4 is increased and maintained to the first standby speed calculated based on the estimated mode to be established. As explained, the operating mode to be established is estimated at step S3 of the routine shown in FIG. 12 based on the current vehicle speed V and the depression Acc of the accelerator pedal or the required drive force F. At point t1, the vehicle speed V is relatively low and the accelerator pedal is not depressed deeply, therefore, the ECU 31 estimates that the operating mode is to be shifted to the Low mode. In this situation, in order to reduce a speed difference between the input element 12a and the output element 12b of the first clutch CL1 in advance of shifting the operating mode to the Low mode, that is, in order to reduce delay in engagement of the first clutch CL1 in the estimated shifting operation to the Low mode, the rotational speed of the first motor 4 is increased in the forward direction and maintained to the first standby speed or within a predetermined speed range around the first standby speed.

As described, the rotational speed of the first motor 4 is changed depending on the vehicle speed V and the depression Acc of the accelerator pedal or the required drive force F. In the example shown in FIG. 12, the rotational speed of the first motor 4 which has been increased to the first standby speed is further increased from point t1 to point t2 with an increase in the vehicle speed V. The depression Acc of the accelerator pedal is maintained from point t2 to point t3 so that the vehicle speed V and the speed of the first motor 4 are maintained to constant speeds from point t2 to point t3. Then, the accelerator pedal is further depressed from point t3, and at point t4, the vehicle speed V reaches a second predetermined speed Vth_2 at which the operating mode is shifted from the Low mode to the High mode. Consequently, the ECU 31 estimates that the operating mode is to be shifted to the High mode. As described, the operating mode to be shifted from the single-motor mode may also be estimated based on the required drive force F or the accelerator position Acc, instead of the current vehicle speed V. For example, if the required drive force F or the accelerator position Acc is less than a predetermined value, the ECU 31 estimates that the operating mode will be shifted to the Low mode. By contrast, if the required drive force F or the accelerator position Acc is equal to or greater than the predetermined value, the ECU 31 estimates that the operating mode will be shifted to the High mode.

In this situation, in order to reduce a speed difference between the input element 18a and the output element 18b of the second clutch CL2 in advance of shifting the operating mode to the High mode, that is, in order to reduce delay in engagement of the second clutch CL2 in the estimated shifting operation to the High mode, a rotational direction of the first motor 4 is switched from the forward direction to the reverse direction and the rotational speed of the first motor 4 is increased in the reverse direction to the second standby speed.

The rotational speed of the first motor 4 thus increased to the second standby speed is further increased in the reverse direction from point t4 to point t5 with an increase in the vehicle speed V, as explained with reference to FIG. 13. At point t5, the vehicle speed V is raised to a level at which the second clutch CL2 is engaged to establish the HV-High mode, and the flag to bring the first motor 4 into the standby mode is turned off. Consequently, a command signal to engage the second clutch CL2 is transmitted to start engagement of the second clutch CL2.

In this situation, a speed difference between the input element 18a and the output element 18b of the second clutch CL2 has been reduced as a result of increasing the rotational speed of the first motor 4 in the reverse direction to the standby speed. When the command signal to engage the second clutch CL2 is transmitted at point t5, an engagement operation of the second clutch CL2 is commenced to engage the input element 18a with the output element 18b of the second clutch CL2. As a result, the rotational speed of the first motor 4 connected to the output element 18b of the second clutch CL2 is increased temporarily in the reverse direction at point t5. According to the example shown in FIG. 14, since the rotational speed of the first motor 4 has been increased in the reverse direction to the second standby speed to reduce the speed difference between the input element 18a and the output element 18b of the second clutch CL2, the engagement operation of the second clutch CL2 can be completed quickly at point t5. As a result, the operating mode of the vehicle Ve is shifted from the single-motor mode to the HV-High mode, and a cranking of the engine 3 is executed by the first motor 4 from point t5. The cranking of the engine 3 is completed at point t6, and the rotational elements of the power split mechanism 6 are rotated as indicated in FIG. 4.

Thus, according to the exemplary embodiment of the present disclosure, a speed difference between the input element and the output element of the clutch is reduced in advance to reduce delay in engagement of the clutch when shifting the operating mode from the single-motor mode to the Low mode or the High mode. To this end, the operating mode to be shifted from the single-motor mode is estimated, and the speed of the first motor 4 is adjusted to the standby speed in accordance with the operating mode to be established. As described, the standby speed of the first motor 4 differs depending on the mode to be established. For example, in the case of shifting the operating mode from the single-motor mode to the Low mode, the rotational speed of the first motor 4 is maintained within the range from zero to the predetermined speed in the forward direction as indicated in FIG. 13. In this case, therefore, the speed difference between the input element 12a and the output element 12b connected to the first motor 4 has already been reduced and hence the first clutch CL1 can be engaged promptly. According to the exemplary embodiment of the present disclosure, therefore, delay in engagement of the first clutch CL1 can be reduced to ensure acceleration response of the vehicle Ve.

By contrast, in the case of shifting the operating mode from the single-motor mode to the High mode, the rotational speed of the first motor 4 is maintained within the range from zero to the predetermined speed in the reverse direction as indicated in FIG. 13. In this case, therefore, the speed difference between the input element 18a connected to the first motor 4 and the output element 18b has already been reduced and hence the second clutch CL2 can be engaged promptly. According to the exemplary embodiment of the present disclosure, therefore, delay in engagement of the second clutch CL2 may also be reduced to ensure acceleration response of the vehicle Ve. Thus, delay in engagement of the clutch can be avoided in any of the cases of shifting the operating mode from the single-motor mode to the High mode and to the Low mode.

By thus reducing the delay in engagement of the clutch, power generated by the prime mover can be delivered promptly and smoothly the drive wheels. According to the exemplary embodiment of the present disclosure, therefore, agility of the vehicle Ve can be enhanced.

Further, since the standby speed of the first motor 4 is changed depending on the operating mode to be established, the time to control the first motor 4 can be shortened in any of the cases of shifting the operating mode from the single-motor mode to the High mode and to the Low mode. According to the exemplary embodiment of the present disclosure, therefore, a time lag due to delay in engagement of the clutch can be reduced in any of the cases of shifting the operating mode from the single-motor mode to the High mode and to the Low mode.

In addition, when the vehicle Ve is propelled at a speed equal to or lower than the first predetermined speed Vth_1 in the single-motor mode, the first motor 4 will not be actuated. According to the exemplary embodiment of the present disclosure, therefore, an electric consumption can be reduced.

Next, here will be explained another example of the present disclosure with reference to FIG. 15. As described, the operating mode to be shifted from the single-motor mode is estimated based on at least one of the current vehicle speed V, the required drive force F, and the accelerator position Acc. For example, when the vehicle speed V is high, the ECU 31 estimates that the operating mode is shifted from the single-motor mode to the High mode. However, if the vehicle speed V is high but the required drive force F is large e.g., when accelerating the vehicle Ve travelling on a highway, when launching the vehicle Ve abruptly, or when the vehicle Ve climbs on an upslope, it is preferable to shift the operating mode from the single-motor mode to the Low mode. In other words, when the accelerator pedal is depressed deeply and abruptly at a rate higher than a predetermined change rate when propelling the vehicle Ve at a high speed, or when the required drive force is greater than a predetermined value, it is preferable to shift the operating mode from the single-motor mode to the Low mode.

Figure 15:
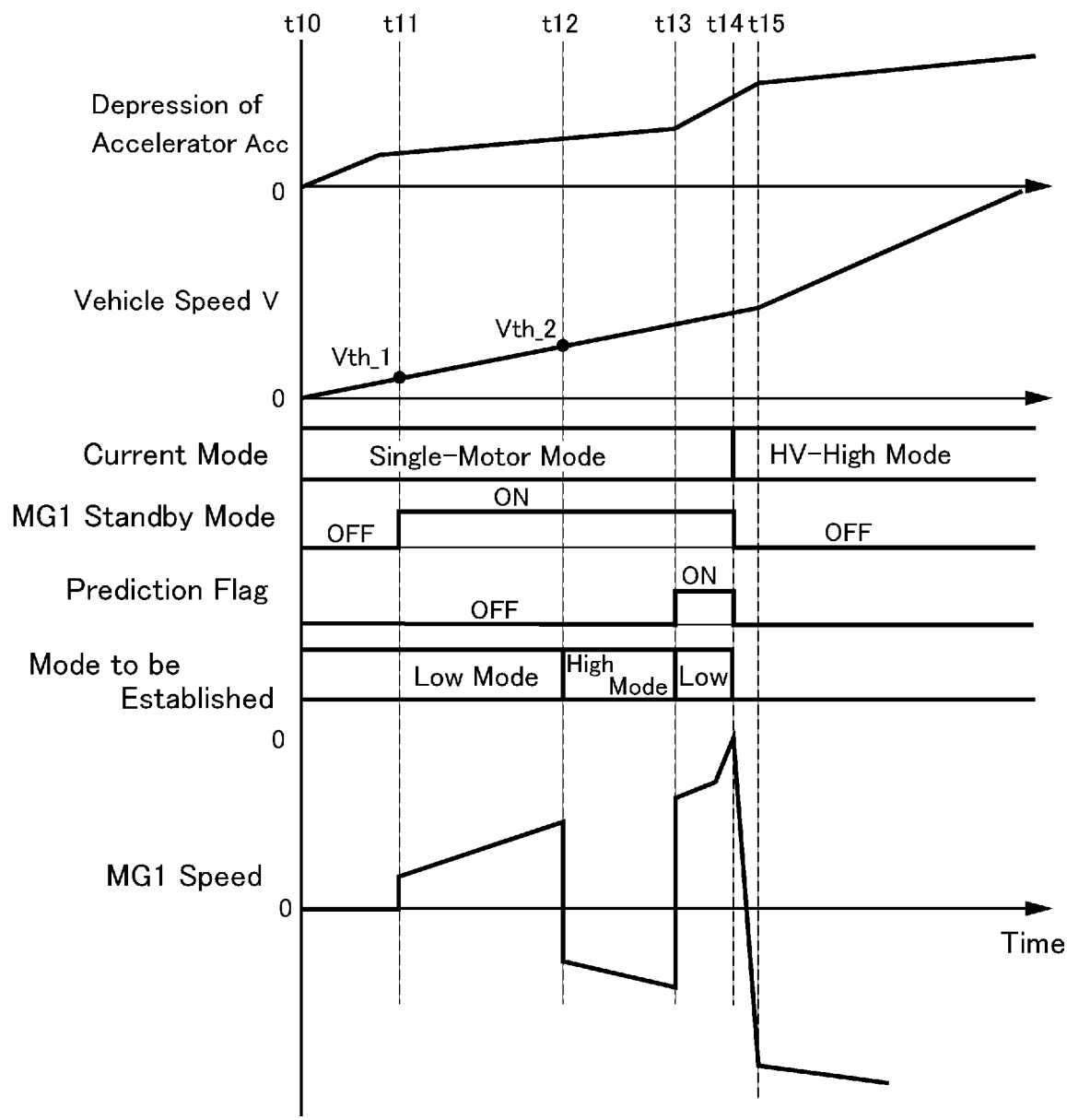
FIG. 15 is a time chart showing another control example executed by the control system according to the embodiment of the present disclosure.

In the example shown in FIG. 15, a prediction flag is employed to predict a fact that a drive force will be required. In the following description, detailed explanation for the controls and situations in common with those in the example shown in FIG. 14 will be omitted.

At point t10, the accelerator pedal is depressed by the driver to launch the vehicle Ve so that the depression Acc is increased gradually. In this situation, accelerator pedal is not depressed deeply and the vehicle speed V is still low, therefore, the vehicle Ve is propelled in the single-motor mode. That is, the vehicle speed V is still lower than the first predetermined speed Vth_1, and hence the first motor 4 has not yet been brought into the standby mode. Specifically, the rotational speed of the first motor 4 is still maintained to zero.

As a result of depressing the accelerator pedal, the vehicle speed V reaches the first predetermined speed Vth_1 at point t1 so that the flag to bring the first motor 4 into the standby mode is turned on. In this situation, the ECU 31 estimates that the operating mode will be shifted from the single-motor mode to the Low mode. Consequently, the speed of the first motor 4 is increased to the first standby speed for the preparation to engage the first clutch CL1, and further increased from point t11 to point t12 with an increase in the vehicle speed V.

The accelerator pedal is further depressed slightly from point t11, and at point t12, the vehicle speed V reaches the second predetermined speed Vth_2 at which the operating mode is shifted from the Low mode to the High mode. Consequently, the ECU 31 estimates that the operating mode will be shifted from the single-motor mode to the High mode. At point t12, therefore, a rotational direction of the first motor 4 is switched from the forward direction to the reverse direction and a rotational speed of the first motor 4 is increased in the reverse direction to the second standby speed for the preparation to engage the second clutch CL2.

At point t13, the depression Acc of the accelerator pedal is increased abruptly and hence the ECU 11 predicts that the required drive force F will be increased abruptly. For example, this situation corresponds to the above-mentioned situations in which the vehicle Ve is accelerated when travelling on a highway, and in which the vehicle Ve climbs on an upslope. At point t13, therefore, the above-mentioned prediction flag is turned on. That is, although the vehicle speed V is higher than the second predetermined speed Vth_2, the ECU 31 estimates that the operating mode will be shifted from the single-motor mode to the Low mode in which the greater drive force can be generated compared to the High mode.

Consequently, at point t13, the rotational direction of the first motor 4 is switched from the reverse direction to the forward direction again, and the rotational speed of the first motor 4 is increased in the forward direction to the first standby speed for the preparation to engage the first clutch CL1. Then, the first clutch CL1 is engaged at point t14, and a cranking of the engine 3 is executed by the first motor 4 from point t14. The cranking of the engine 3 is completed at point t15, and the rotational elements of the power split mechanism 6 are rotated as indicated in FIG. 5.

Thus, according to another example of the present disclosure shown in FIG. 15, the prediction flag is turned on when the accelerator pedal is depressed deeply at a rate equal to or higher than a predetermined rate and hence the required drive force F is expected to be increased abruptly. In this case, although the vehicle speed V is higher than the second predetermined speed Vth_2, the ECU 31 estimates that the operating mode will be shifted from the single-motor mode to the Low mode. According to another example of the present disclosure, therefore, the first clutch CL1 can be engaged promptly to shift the operating mode to the Low mode when the large drive force is required during propulsion in the single-motor mode. For this reason, the acceleration response of the vehicle Ve may also be ensured and the required drive force may be delivered to the drive wheels even when the large drive force is required during propulsion in the single-motor mode.

Although the above exemplary embodiments of the present disclosure have been described, it will be understood by those skilled in the art that the present disclosure should not be limited to the described exemplary embodiments, and various changes and modifications can be made within the scope of the present disclosure. For example, the first clutch CL1 or the second clutch CL2 may be engaged promptly not only when shifting from the single-motor mode to the HV-High mode or to the HV-Low mode but also when shifting from the single-motor mode to the EV-High mode or to the EV-Low mode. In addition, the depression Acc of the accelerator pedal may also be employed as a parameter to bring the first motor 4 into the standby mode.

What is claimed is:

1. A control system for a hybrid vehicle, comprising:
   a prime mover including an engine, a first motor, and a second motor;
   a first differential mechanism that performs a differential action among a first rotary element that is connected to the engine, a second rotary element that is connected to the first motor, and a third rotary element that transmits torque to a pair of drive wheels;
   a second differential mechanism that performs a differential action among a fourth rotary element that is connected to the second motor, a fifth rotary element that is connected to the third rotary element, and a sixth rotary element;
   a first engagement device that selectively connects the first rotary element to the sixth rotary element; and
   a second engagement device that selectively connects any of the fourth rotary element, the fifth rotary element, and the sixth rotary element,
   wherein a speed of the first engagement device and the second engagement device are controlled respectively by the first motor when engaged, and
   an operating mode is selected from a plurality of modes including
      a first mode established by engaging the first engagement device,
      a second mode established by engaging the second engagement device, in which the torque delivered to the drive wheels is smaller compared to the first mode, and
      a single-motor mode established by disengaging both of the first engagement device and the second engagement device, in which the hybrid vehicle is propelled only by a drive torque generated by the second motor,
   each of the first engagement device and the second engagement device comprises an input element and an output element engaged to each other to transmit the torque, and
   a speed difference between the input element and the output element of each of the first engagement device and the second engagement device is controlled by the first motor,
   the control system comprising:
   a controller that controls the first motor,
   wherein the controller is configured to
   estimate an operating mode to be shifted from the single-motor mode to the first mode and the second mode,
   adjust a speed of the first motor to a first standby speed at which the speed difference between the input element and the output element of the first engagement device is reduced, when the controller estimates that the operating mode will be shifted from the single-motor mode to the first mode, and
   adjust the speed of the first motor to a second standby speed at which the speed difference between the input element and the output element of the second engagement device is reduced, when the controller estimates that the operating mode will be shifted from the single-motor mode to the second mode.

2. The control system for the hybrid vehicle as claimed in claim 1, wherein the controller is further configured to
   determine a satisfaction of a condition to adjust the speed of the first motor to the first standby speed or the second standby speed, and
   adjust the speed of the first motor to the first standby speed or the second standby speed upon satisfaction of the condition.

3. The control system for the hybrid vehicle as claimed in claim 2, wherein the controller is further configured to
   detect a speed of the hybrid vehicle,
   determine that the condition to adjust the speed of the first motor to the first standby speed or the second standby speed is satisfied if the detected speed of the hybrid vehicle is higher than a first predetermined speed, and
   determine that the condition to adjust the speed of the first motor to the first standby speed or the second standby speed is not satisfied if a detected speed of the hybrid vehicle is equal to or lower than the first predetermined speed.

4. The control system for the hybrid vehicle as claimed in claim 1, wherein the controller is further configured to
   detect a speed of the hybrid vehicle,
   detect a required drive force to propel the hybrid vehicle, and
   estimate the operating mode to be shifted from the single-motor mode based on at least any one of the speed of the hybrid vehicle and the required drive force.

5. The control system for the hybrid vehicle as claimed in claim 1, wherein the controller is further configured to
    detect a speed of the hybrid vehicle,
    detect a required drive force to propel the hybrid vehicle, and
    calculate the first standby speed and the second standby speed based on the speed of the hybrid vehicle or the required drive force and the estimated operating mode to be shifted from the single-motor mode.

6. The control system for the hybrid vehicle as claimed in claim 4, wherein the controller is further configured to
    estimate the operating mode to be shifted from the single-motor mode based on the required drive force,
    estimate that the operating mode is to be shifted from the single-motor mode to the first mode when the required drive force is less than a predetermined value, and
    estimate that the operating mode is to be shifted from the single-motor mode to the second mode when the required drive force is equal to or greater than the predetermined value.

7. The control system for the hybrid vehicle as claimed in claim 4, wherein the controller is further configured to
    estimate the operating mode to be shifted from the single-motor mode based on the speed of the hybrid vehicle,
    estimate that the operating mode is to be shifted from the single-motor mode to the first mode when the speed of the hybrid vehicle is higher than the first predetermined speed but lower than a second predetermined speed, and
    estimate that the operating mode is to be shifted from the single-motor mode to the second mode when the speed of the hybrid vehicle is equal to or higher than the second predetermined speed.

8. The control system for the hybrid vehicle as claimed in claim 1,
    wherein the first standby speed is set in a forward direction corresponding to a rotational direction of the engine, and
    the second standby speed is set in a reverse direction opposite to the rotational direction of the engine.

9. The control system for the hybrid vehicle as claimed in claim 8, wherein the controller is further configured to
    increase the first standby speed in the forward direction with an increase on a speed of the hybrid vehicle, and
    increase the second standby speed in the reverse direction with an increase on the speed of the hybrid vehicle.

10. The control system for the hybrid vehicle as claimed in claim 1, wherein the controller is further configured to
    detect a position of an accelerator pedal,
    detect a required drive force to propel the hybrid vehicle, and
    estimate that the operating mode is shifted from the single-motor mode to the first mode when the position of the accelerator pedal is changed at a rate equal to or higher than a predetermined change rate, or when the required drive force is equal to or greater than a predetermined value.

* * * * *